United States Patent
Kondo et al.

(10) Patent No.: US 8,034,151 B2
(45) Date of Patent: Oct. 11, 2011

(54) METHOD FOR REMOVING BORON FROM SILICON

(75) Inventors: Jiro Kondo, Futtsu (JP); Kensuke Okazawa, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 512 days.

(21) Appl. No.: 10/591,093

(22) PCT Filed: Mar. 2, 2005

(86) PCT No.: PCT/JP2005/004016
§ 371 (c)(1),
(2), (4) Date: Aug. 29, 2006

(87) PCT Pub. No.: WO2005/085134
PCT Pub. Date: Sep. 15, 2005

(65) Prior Publication Data
US 2007/0180949 A1    Aug. 9, 2007

(30) Foreign Application Priority Data

Mar. 3, 2004 (JP) ................................. 2004-059156

(51) Int. Cl.
*C21B 11/10*    (2006.01)
(52) U.S. Cl. ...................................................... 75/10.5
(58) Field of Classification Search .................... 75/10.5
See application file for complete search history.

(56) References Cited

U.S. PATENT DOCUMENTS

| | | | | |
|---|---|---|---|---|
| 5,788,945 | A | * | 8/1998 | Schei .............................. 423/348 |
| 6,368,403 | B1 | * | 4/2002 | Schmid et al. ................... 117/79 |
| 2005/0139148 | A1 | * | 6/2005 | Fujiwara et al. ................ 117/13 |

FOREIGN PATENT DOCUMENTS

| | | |
|---|---|---|
| CN | 1143605 A | 2/1997 |
| GB | 2 116 956 | 10/1983 |
| JP | 55-67519 | 5/1980 |
| JP | 56-32319 A | 4/1981 |
| JP | 58-130114 A | 8/1983 |
| JP | 4-130009 A | 5/1992 |
| JP | 4-193706 A | 7/1992 |
| JP | 4-228414 A | 8/1992 |
| JP | 5-246706 A | 9/1993 |
| JP | 9-202611 A | 8/1997 |
| JP | 09202611 A | 8/1997 |
| JP | 2003-12317 A | 1/2003 |
| JP | 2003012317 A | 1/2003 |
| WO | WO 89/02415 | 3/1989 |
| WO | WO8924150 * | 3/1989 |
| WO | WO 03/066523 A1 | 8/2003 |

OTHER PUBLICATIONS

Hurley, john et al, the effects of atmosphere and additives on coal slag viscosity, Mar. 1996, 691-694.*
Mitsuru Tanahashi et al., Distribution Behavior of Boron Between $SiO_2$-saturated $NaO_{0.5}$-CaO-$SiO_2$ Flux and Molten Silicon, Journal of the Mining and Materials, Processing Institute of Japan, vol. 118, No. 7, pp. 497-505, 2002.
Chinese Office Action dated May 30, 2008 issued in corresponding Chinese Application No. 2005800064695.
European Search Report dated Jan. 20, 2010 issued in corresponding European Application No. 05 72 0288.

* cited by examiner

*Primary Examiner* — Melvin C Mayes
*Assistant Examiner* — Stefanie Cohen
(74) *Attorney, Agent, or Firm* — Kenyon & Kenyon LLP

(57) ABSTRACT

The present invention provides a method for removal of boron from metal silicon inexpensively and extremely efficiently by a simple method, specifically, heating metal silicon containing boron as an impurity to its melting point to 2200° C. to place it in a molten state, then adding a solid mainly comprised of silicon dioxide and a solid mainly comprised of one or both of a carbonate of an alkali metal or a hydrate of a carbonate of an alkali metal into said molten silicon so as to form a slag and remove the boron in the silicon.

15 Claims, No Drawings

US 8,034,151 B2

METHOD FOR REMOVING BORON FROM SILICON

TECHNICAL FIELD

The present invention relate to a method for removal of boron (B) from metal silicon by a simple method. The obtained silicon may then be further stripped of impurities other than boron and used as the raw material for a solar battery.

BACKGROUND ART

Silicon used for a solar battery is generally required to have a 99.9999% or so purity. The various types of metal impurities are required to be 0.1 mass ppm or less and the B is required to be at least 0.3 mass ppm or less, preferably 0.1 mass ppm or less. As silicon satisfying this purity, there is semiconductor use silicon obtained by the Siemen's process, that is, high purity silicon obtained by distilling, then heat decomposing silicon chloride. However, this Siemen's process is high in cost and not suitable for solar batteries requiring large amounts of silicon.

As an inexpensive silicon, there is metal silicon obtained by using an arc furnace and reducing silica stone by carbon, but the purity is normally 98% or so and the result includes Fe, Al, Ca, or other various types of metal impurities and the P, B, etc. used as silicon dopants. For this reason, this cannot be used as is as the raw material for solar batteries. Therefore, many attempts have been made trying to refine this inexpensive metal silicon for use for solar batteries.

Among the impurities contained in metal silicon, Fe, Al, Ca, or other various types of metal impurities can be removed by the one-directional solidification method. That is, this refining method uses the phenomenon that when a silicon melt solidifies, the copresent molten silicon contains a large amount of metal impurities while the solidified silicon only takes in a little. "The concentration of impurities in solid phase silicon/concentration of impurities in liquid phase silicon" is called the "segregation coefficient". With Fe, Al, Ca, and other various types of metal impurities, the segregation coefficient is far smaller than 1, so silicon can be removed by this one-directional solidification method. That is, by concentrating these impurities in the finally solidifying part, these impurities can be removed from the other major part of the silicon.

Further, the impurities with large vapor pressure in the metal silicon, for example, the P, Ca, Na, etc., can be removed from the silicon by melting the silicon under reduced pressure, that is, by the vacuum melting method.

As opposed to this, B has a segregation coefficient close to 1 and has a small vapor pressure, so is difficult to remove by the above methods. Various methods have therefore been proposed for this.

Japanese Unexamined Patent Publication No. 56-32319 discloses the method of acid washing silicon, the vacuum melting method, the one-direction solidification method, and a method of removal of B from silicon by the slag refining method. According to this, the extraction use melt, more specifically a total 10 kg of $CaF_2$+$CaO$+$SiO_2$ slag, and 5 kg of silicon can be melted together at 1450 to 1500° C. to reduce the boron B in the silicon from 30 mass ppm to 8 mass ppm. However, the rate of drop of B is small and the content of B remains large even after the treatment, so this is insufficient as silicon for use for solar batteries. Further, in the slag refining method, the B in the molten silicon is removed by being absorbed in the slag, but with slag of the above composition, the B distribution coefficient (concentration of B in molten slag/concentration of B in molten silicon) is a small 1.375, so there is the inconvenience that the slag refining method has to be repeated again and again. For example, when the concentration of B in the silicon is 10 mass ppm and using the above slag in double the amount of the silicon in the same way as the above example, even if the slag used contains no B at all, even if performing the slag refining operation three times, the B will not be reduced to 0.3 mass ppm or less. Further, normally, the slag used contains at least several mass ppm or so of B. Further, slag is normally used in only the same amount as the silicon or less, so the number of slag refining operations becomes further greater.

Japanese Unexamined Patent Publication No. 58-130114 describes a slag refining method comprising vigorously mixing slag containing one or both of an alkali earth metal or alkali metal oxide or slag ingredients and crushed crude silicon (purity equivalent to metal silicon) before melting, then melting them. However, in general, crushing the crude silicon of the raw material requires considerable cost. Further, at the time of crushing, contamination frequently occurs. Further, vigorous mixing also requires considerable cost. Further, when repeatedly performing this refining operation, it is necessary to crush the silicon each time and mix it with the slag. This becomes extremely troublesome. For this reason, in an industrial process, a processing including a crushing step and a mixing step is not preferable. Further, according to the examples in Japanese Unexamined Patent Publication No. 58-130114, the concentration of B in the finally obtained silicon is 1 mass ppm. This is insufficient as silicon used for solar batteries.

Japanese Unexamined Patent Publication No. 2003-12317 discloses a slag refining method adding flux (slag) to metal silicon and blowing in an oxidizing gas. In this method, it is considered possible to simultaneously realize a high basicity and high oxygen partial pressure of the slag and possible to efficiently remove the B in the silicon. As basic ingredients in the slag, CaO, $CaCO_3$, and $Na_2O$ may be mentioned. The examples describe that B is reduced from an initial concentration of 14 mass ppm to 7.6 mass ppm. However, blowing gas into molten silicon is considerably difficult. In particular, there is no material suitable for forming the nozzle for blowing in the gas. Further, the concentration of B in the finally obtained silicon is also 7.6 mass ppm—which is insufficient as silicon used for solar batteries.

Further, "Distribution Behavior of Boron Between $SiO_2$-saturated $NaO_{0.5}$—CaO—$SiO_2$ Flux-Molten Silicon" (Tanahashi et al., Shigen To Sozai (Journal of the Mining and Materials) Processing Institute of Japan, vol. 118, No. 7, P497 to 505, (2002)) also describes the slag refining method. The slag used is $Na_2O$—CaO—$SiO_2$. This slag is produced in advance at 1700° C. (1973K), then charged into a metal silicon bath with a high initial B concentration for slag refining. It is stated that the B distribution coefficient at this time is as high as 3.5 and that this is an improvement over the highest value of 2.2 of the B distribution coefficient up to then. However, with a B distribution coefficient of 3.5 or so, in principle, the concentration of B in the silicon can only be reduced to 0.4 mass ppm or so, so production of silicon for use for solar batteries is difficult. This is because, as explained later, the concentration of B in the slag used cannot be reduced to "zero" and 1 to several mass ppm or so is always included.

Further, as an industrial process in which slag refining is generally performed, there is the steelmaking process, but B oxides are far stabler than iron oxides, so in the steelmaking process, it is possible to oxidize the B without allowing oxidation of the iron and allow the B oxides formed to be absorbed by the slag and thereby easily remove them. As opposed to this, B oxides and silicon oxides are substantially the same in stability. If trying to oxidize B and get it absorbed by the slag, the silicon will also end up being oxidized. In this way, silicon and iron greatly differ in characteristics, so the slag refining technology of the steelmaking process cannot be applied as it is to silicon.

As a method for removal of B in silicon by a method other than slag refining, the method of oxidizing the B in the silicon and vaporizing it to remove it from the silicon has been conceived. However, due to the above mentioned reasons, silicon is also oxidized when oxidizing the B, so with each of the methods shown below, there is the problem of a low silicon recovery rate.

Japanese Unexamined Patent Publication No. 4-130009 discloses a method for advantageously removing B etc. by adding an $H_2O$ gas or $O_2$, $CO_2$, or other oxidizing gas and CaO, $SiO_2$, or another oxygen-containing substance to a plasma gas. According to the examples, B is reduced from the initial 8.0 mass ppm to 0.2 mass ppm.

Japanese Unexamined Patent Publication No. 4-228414 also discloses the method of adding water vapor and silica ($SiO_2$) to a plasma jet to refine silicon. According to the examples, B is reduced from the initial 17 mass ppm to 1.0 mass ppm.

Japanese Unexamined Patent Publication No. 5-246706 discloses a method of removal of B by generating an arc between molten silicon and an upper electrode and blowing an inert gas, preferably an oxidizing gas, into the vessel.

Further, as a method utilizing a special torch instead of plasma or an arc, U.S. Pat. No. 5,972,107 and U.S. Pat. No. 6,368,403 disclose a method of adding water vapor and $SiO_2$ to an oxygen-hydrogen torch to refine molten silicon and further a method of adding, in addition to $SiO_2$, CaO, BaO, and $CaF_2$ to refine molten silicon.

As a method for removal of B as the oxidized gas and not using any plasma, arc, or special torch, Japanese Unexamined Patent Publication No. 4-193706 discloses a method of melting silicon in a container having a gas blowing tuyere at its bottom and mainly comprised of silica and further mixing and blowing Ar or $H_2$ gas or a mixed gas of the same, preferably further with one or more types of oxidizing gas such as $H_2O$, $CO_2$, or $O_2$ from this tuyere. In this method, the B can be considered to be removed in the form of an oxide gas. Further, it is described that when the raw material silicon has a high concentration of B, adding a mixture of one or more of $SiO_2$, CaO, $CaCl_2$, and $CaF_2$ to the gas blown from the tuyere is advantageous for B removal. According to the examples, B is reduced from the initial 25 mass ppm to 5 mass ppm.

Japanese Unexamined Patent Publication No. 9-202611 discloses a method of removal of B comprising blowing one or more solids decomposing at 1400° C. or less and generating one or both of $H_2O$ or $CO_2$ into a molten silicon bath together with a carrier gas. In this method, it is described that $Ca(OH)_2$, $CaCO_3$, and $MgCO_3$ are used, and B becomes the oxide gas which is exhausted together with the carrier gas. Further, the examples describe that the B concentration in the silicon falls to 1 ppm or less.

WO89/02415 discloses a method comprising adding a chloride to cause the formation of boron chloride and thereby remove the B. For example, $CaCl_2$, CaO, and $SiO_2$ are used to lower the B concentration from the initial 17 mass ppm to 5 mass ppm.

The above conventional refining methods utilizing slag will be summarized next.

The first group comprises methods of absorbing and distributing B in the molten silicon in slag so as to lower the B in the silicon. These include the method of crushing and mixing silicon and the slag ingredients in advance before melting and the method of introducing an oxidizing gas in addition to the slag.

The second group comprises the methods utilizing plasma, an arc, or a special torch, adding an oxidizing gas or $SiO_2$ or one or more of CaO, BaO, and $CaF_2$ to convert the B to an oxide, and vaporizing it for removal.

The third group comprises the method of not using plasma etc., but blowing in Ar or $H_2$, preferably one or more oxidizing gases of $H_2O$, $CO_2$, or $O_2$, into the molten silicon, or the method of adding one or more of $SiO_2$, CaO, $CaCl_2$, and $CaF_2$, and the method of blowing into the molten silicon bath one or more solids decomposing at 1400° C. or less and generating one or both of $H_2O$ or $CO_2$ together with the carrier gas. Further, there is the method focusing on use of chlorides.

DISCLOSURE OF THE INVENTION

In the first group of B removal methods utilizing slag, the normally utilized slag or slag raw materials includes B in an amount of 1 to several mass ppm or so. In the laboratory, refining slag itself to obtain slag of an extremely high purity with little B may not be impossible, but industrially it is impossible to obtain slag not containing almost any B. For this reason, the actual act of adding slag to the silicon contaminates the silicon. With just absorption and distribution of B in slag, the B in the silicon cannot be sufficiently reduced. For example, with slag containing B in an amount of 1.5 ppm and a B distribution coefficient of the highest value of 3.5 up to now described in "Distribution Behavior of Boron Between $SiO_2$-saturated $NaO_{0.5}$—CaO—$SiO_2$ Flux-Molten Silicon" (Tanahashi et al., Shigen To Sozai (Journal of the Mining and Materials) Processing Institute of Japan, vol. 118, No. 7, P497 to 505, (2002)), even if repeating the slag refining operation (absorption and distribution of B in slag) an extremely large number of times, reducing the B to 0.43 mass ppm (1.5/3.5=0.43) or less is in principle impossible. If an extremely high B distribution coefficient can be realized, the B in the silicon can be further reduced, but with the B distribution coefficient obtained by slag refining up to now, under the above conditions, 0.4 mass ppm or so has been the limit. For this reason, with just the first group of methods, production of silicon for solar batteries is currently difficult.

The second group of methods using plasma etc. can remove B by vaporization, so in principle have none of the difficulties of the first group of methods, but the hardware required becomes large, so the cost increases. This is not preferable industrially.

The third group of methods blow in slag raw materials together with the gas, but molten silicon is extremely reactive, so a gas introduction part having a tuyere or a nozzle would corrode or break because of this, so this is not industrially preferable. Further, the method focusing on use of chlorides generates gas containing chlorides, so considerable exhaust treatment becomes necessary, so, again, this is not industrially preferable.

Further, like with the first group of methods, in the second group and third group of methods as well, there was the problem of a low B distribution coefficient.

The present invention, to solve the above problems, proposes a method for raising the B distribution coefficient in slag refining. Further, it proposes a method using an extremely simple furnace with no tuyeres or nozzles for the simultaneous absorption and distribution of B in the slag and the removal of B by vaporization.

The present invention is configured as follows:

(1) A method for removing boron from silicon characterized by heating metal silicon containing boron as an impurity to its melting point to 2200° C. to place it in a molten state, then adding a solid mainly comprised of silicon dioxide and a solid mainly comprised of one or both of a carbonate of an alkali metal or a hydrate of a carbonate of an alkali metal into said molten silicon so as to form a slag and remove the boron in the silicon.

(2) A method for removing boron from silicon as set forth in the above (1), further comprising discharging the formed slag.

(3) A method for removing boron from silicon as set forth in the above (2), wherein the interval from adding the solid mainly comprised of silicon dioxide and the solid mainly comprised of one or both of a carbonate of an alkali metal or a hydrate of a carbonate of an alkali metal to then discharging the formed slag is 5 minutes or more.

(4) A method for removing boron from silicon as set forth in the above (1) to (3), further comprising simultaneously adding the solid mainly comprised of silicon dioxide and the solid mainly comprised of one or both of a carbonate of an alkali metal or a hydrate of a carbonate of an alkali metal.

(5) A method for removing boron from silicon as set forth in the above (1) to (3), further comprising separately adding the solid mainly comprised of silicon dioxide and the solid mainly comprised of one or both of a carbonate of an alkali metal or a hydrate of a carbonate of an alkali metal.

(6) A method for removing boron from silicon as set forth in the above (5), wherein the interval of said addition is within 30 minutes.

(7) A method for removing boron from silicon as set forth in the above (1), further comprising adding the solid mainly comprised of silicon dioxide and the solid mainly, comprised of one or both of a carbonate of an alkali metal or a hydrate of a carbonate of an alkali metal, divided into two or more operations.

(8) A method for removing boron from silicon as set forth in the above (7), further comprising discharging already formed slag, then newly adding the solid mainly comprised of silicon dioxide and the solid mainly comprised of one or both of a carbonate of an alkali metal or a hydrate of a carbonate of an alkali metal.

(9) A method for removing boron from silicon as set forth in the above (8), wherein the interval from when adding the solid mainly comprised of silicon dioxide and the solid mainly comprised of one or both of a carbonate of an alkali metal or a hydrate of a carbonate of an alkali metal to molten silicon to then discharging the formed slag is 5 minutes or more.

(10) A method for removing boron from silicon as set forth in the above (8), further comprising performing the process of adding the solid mainly comprised of silicon dioxide and the solid mainly comprised of one or both of a carbonate of an alkali metal or a hydrate of a carbonate of an alkali metal to form slag, then discharging the slag a plurality of times.

(11) A method for removing boron from silicon as set forth in the above (10), wherein while performing the processing of adding the solid mainly comprised of silicon dioxide and the solid mainly comprised of one or both of a carbonate of an alkali metal or a hydrate of a carbonate of an alkali metal to form slag, then discharging the slag a plurality of times, the concentration of boron in the molten silicon becomes 1 mass ppm or less.

(12) A method for removing boron from silicon as set forth in the above (1), the amounts of addition of the solid mainly comprised of silicon dioxide and the solid mainly comprised of one or both of a carbonate of an alkali metal or a hydrate of a carbonate of an alkali metal are amounts whereby the formed slag does not completely cover the surface of the molten silicon.

(13) A method for removing boron from silicon as set forth in the above (1), wherein a mole of silicon in the silicon dioxide added is 0.05 to 20 times the mole of the alkali element in one or both of the carbonate of an alkali metal and the hydrate of a carbonate of an alkali metal.

(14) A method for removing boron from silicon as set forth in the above (1), wherein the alkali element of one or both of the carbonate of an alkali metal and the hydrate of a carbonate of an alkali metal is one or more of lithium, sodium, and potassium.

(15) A method for removing boron from silicon as set forth in the above (14), wherein one or both of the carbonate of an alkali metal and the hydrate of a carbonate of an alkali metal is one or more of lithium carbonate, sodium carbonate, potassium carbonate, lithium bicarbonate, sodium bicarbonate, potassium bicarbonate, or their hydrates.

(16) A method for removing boron from silicon as set forth in the above (1), further comprising adding an additive for increasing a viscosity of the formed slag.

The present invention is mainly configured as follows:

The present invention is mainly configured by the method of directly adding both silicon dioxide and a carbonate of an alkali metal to molten silicon, absorbing and distributing B in the formed slag, and, at this time, removing a considerable amount of the B by vaporization and, suitably thereafter, separating the silicon and the slag. In this method, gas does not have to be blown in, therefore there is no need to provide the furnace with a tuyere or nozzle and an extremely simple furnace can be used for working the present invention. Further, instead of a carbonate of an alkali metal, a hydrate of such a carbonate may be used. There are distinctive advantages when using a hydrate.

Here, there are the following two important points in the main configuration of the present invention:

First, there is the point of adding silicon dioxide and a carbonate of an alkali metal as they are to the molten silicon. That is, the silicon dioxide and carbonate of an alkali metal are not treated in advance to form a slag. For example, in the previous cited "Distribution Behavior of Boron Between $SiO_2$-saturated $NaO_{0.5}$—CaO—$SiO_2$ Flux-Molten Silicon" (Tanahashi et al., Shigen To Sozai (Journal of the Mining and Materials) Processing Institute of Japan, vol. 118, No. 7, P497 to 505, (2002)), slag of an $Na_2O$—CaO—$SiO_2$ composition slag is produced in advance at 1700° C. (1973K), then is charged into a metal silicon bath with an initially high B concentration for slag refining. In the present invention, as pointed out in the examples and comparative examples as well, it is important that the silicon dioxide and the carbonate of an alkali metal not be converted into slag in advance, but be added as they are into the molten silicon. According to this method, a B distribution coefficient of 5 to 10 or more, which is an extremely high value, is obtained and B can be reduced to 0.1 mass ppm or less. If the silicon dioxide and the carbonate of an alkali metal are converted to slag in advance and then added, the B distribution coefficient would be 2 or so or just the same level as the prior art. Further, the action of vaporizing the B is also exhibited only when adding the silicon dioxide and the carbonate of an alkali metal as they are to the molten silicon without converting them into a slag in advance.

Further, as the reason why the method of the present invention of adding silicon dioxide and the carbonate of an alkali metal as they are into the molten silicon without converting them into slag in advance has not been attempted up to now, it is believed that with the method of the present invention, a considerably violent reaction is believed to occur, so this was averred. The inventors also imagined that this might be so before the experiments, but confirmed that in fact the reaction was not that violent.

Further, when using a hydrate of a carbonate of an alkali metal instead of a carbonate of an alkali metal, the reaction becomes somewhat violent, but there is the advantage that the B distribution coefficient is further improved.

Note that in the following explanation, "a carbonate of an alkali metal and a hydrate of a carbonate of an alkali metal" will also be described as "a carbonate of an alkali metal etc."

The second important point is the requirement of the addition of silicon dioxide. For example, the previously cited Japanese Unexamined Patent Publication No. 9-202611 discloses a method of removal of B blowing one or more solids decomposing at 1400° C. or less and generating one or both of $H_2O$ or $CO_2$ together with a carrier gas into a molten silicon bath. The method of this Japanese Unexamined Patent Publication No. 9-202611 uses a nozzle etc. to blow the solid into the molten silicon, so inherently differs from the present invention enabling simple addition and, further, does not allude to a carbonate of an alkali metal either, but the decisive point of difference from the present invention is that silicon dioxide is not added. In the present invention, if not adding silicon dioxide and adding only a carbonate of an alkali metal, the majority of the carbonate of the alkali metal will quickly end up vaporizing and almost no slag will be formed. Further, since it ends up quickly vaporizing, the action of B being distributed and absorbed at the slag which might be slightly produced and the action of vaporization of the B will end up being greatly lost. Only when silicon dioxide and a carbonate of an alkali metal are added is the action of B being distributed and absorbed at the slag or the action of vaporization of the B greatly exhibited.

According to the present invention, an extremely simple atmospheric melting furnace may be used and the simple method of just charging silicon dioxide and a carbonate of an alkali metal into the molten silicon may be used to remove B from inexpensive metal silicon containing B down to 0.3 mass ppm or less of further 0.1 mass ppm or less. By jointly using the present method and the one-directional solidification method or vacuum melting method, it is possible to refine metal silicon into high purity silicon able to be used for solar batteries extremely inexpensively.

BEST MODE FOR WORKING THE INVENTION

The present invention is a method of directly adding silicon dioxide and one or both of a carbonate of an alkali metal or a hydrate of a carbonate of an alkali metal to molten silicon, absorbing and distributing B at the formed slag, and, at that time, removing a considerable amount of the B by vaporization and, suitably thereafter, separating the silicon and slag.

As the temperature of the molten silicon, the melting point of silicon (1414° C.) to 2200° C. is preferable. If higher than this, the reaction between the molten silicon and the added silicon dioxide and carbonate of an alkali metal or other hydrate will become violent. This is not preferable industrially.

The slag and the silicon should be separated after the elapse of 5 minutes or so from when the silicon dioxide and carbonate of an alkali metal etc. are charged. If 5 minutes or so, the reaction between the slag raw materials and silicon will proceed to a certain extent. Further, from the viewpoint of the productivity, the slag should be separated after two hours from when these slag raw materials are charged. This is because if after 2 hours or so, it is believed that the reaction will be substantially complete.

The method of addition of the silicon dioxide and carbonate of an alkali metal etc. may be charging them from above the crucible of the molten silicon. The silicon dioxide and the carbonate of an alkali metal etc. may be simultaneously charged in predetermined amounts, but from the viewpoint of the convenience in the facility etc., a certain time interval may also be provided between them. The important point is to create a state where the silicon dioxide and the carbonate of an alkali metal etc. coexist. The silicon dioxide and the carbonate of an alkali metal etc. gradually react to form a slag, but this reaction takes several minutes to 30 minutes or so, so the two materials may also be charged separately so long as in this time period. The unreacted silicon dioxide and the carbonate of an alkali metal etc. will coexist with the molten silicon. In this case, depending on the amounts of the unreacted coexisting silicon dioxide and carbonate of an alkali metal etc., an effect of absorption of B in the subsequently formed slag or an effect of vaporization of B will be manifested. In this way, if considered from the viewpoint of efficiency, simultaneous addition of the two is the most preferable, but is not essential. Further, the method of addition of the silicon dioxide and carbonate of an alkali metal etc. is not limited to charging. Depending on the facility, it may also be blowing or another method.

In the present invention, the distribution coefficient of B in the slag formed from the silicon dioxide and the carbonate of an alkali metal etc. (concentration of B in molten slag/concentration of B in molten silicon) becomes an extremely high 5 to 10 or more. Further, simultaneously vaporization and dispersion of B also occur, so the effect of removal of B from the silicon becomes extremely high. The reason which these two phenomena occur is not clear, but the inventors believe that they are due to the efficient formation of an alkali boron oxide. For example, when using $Na_2CO_3$ as the carbonate of an alkali metal, it is believed that there is a possibility of $NaBO_2$ being formed and dissolving in the slag. $NaBO_2$ is a stable compound and has a boiling point of 1430° C. or so, so has sufficient vapor pressure at the melting point of silicon or more. Therefore, vaporization and dispersion in the form of this $NaBO_2$ is believed to be fully possible. Therefore, the method of the present invention of simultaneously adding silicon dioxide and a carbonate of an alkali metal etc. is believed to be a method efficiently converting the B in the molten silicon to an alkali boron oxide. Further, compared a carbonate of an alkali metal and its hydrate, use of a hydrate results in a somewhat higher distribution coefficient. However, the reaction with silicon also becomes somewhat violent, so which to use or whether to use both should be judged from the hardware structure, the operating environment, etc.

What should be particularly noted is that in the present invention, the more the concentration of boron in the molten silicon falls, the greater the B distribution coefficient. Such an effect has never before been reported. This is considered a distinctive effect of using silicon dioxide and a carbonate of an alkali metal etc. as slag raw materials and adding all of these as they are into the molten silicon. Specifically, if the concentration of boron in the molten silicon is 5 to 10 mass ppm or so, the B distribution coefficient is 5 to 7 or so. Even a B distribution coefficient of 5 to 7 is a sufficiently large value, but if the concentration of boron in the molten silicon falls to 1 mass ppm or so, the B distribution coefficient will become an extremely large value of 10 or more. That is, the more the B is removed from the silicon, the easier the removal of B becomes. This is an extremely great advantage of the present invention.

In this regard, the inventors believe as follows. The possibility that B moves to the slag in the form of an alkali boron oxide was as previously pointed out, but the added silicon dioxide and carbonate of an alkali metal etc. react with B to form an alkali boron oxide. The silicon dioxide and carbonate of an alkali metal etc. themselves react with each other to form an alkali silicate glass. If the reaction speeds in the formation of the alkali boron oxide and alkali silicate glass are in a fixed ratio, depending on this ratio, an alkali boron oxide will be formed only up to a limited amount within the amounts of addition of the silicon dioxide and carbonate of an alkali metal etc. For this reason, when the B concentration is high, there is a possibility of occurrence of an upper limit value in the amount of production of alkali boron oxide. As opposed to this, it is believed that when the B concentration is low, even if the reaction speeds in formation of the alkali boron oxide and alkali silicate glass are in a certain ratio, a sufficient proportion of B in the entire amount of B in the silicon can be converted to an alkali boron oxide, so the B distribution coefficient becomes larger. This line of thinking enables the increase in the B distribution coefficient the lower the concentration of boron in the molten silicon to be explained. Further, as will be understood from this line of thought, the phenomenon of the concentration of boron in the silicon being 1 mass ppm or so and the B distribution coefficient being an extremely large 10 or more may be considered a phenomenon distinctive to the present invention where an alkali boron oxide is formed.

The number of charging operations of the silicon dioxide and the carbonate of an alkali metal etc. is not particularly limited and may be one operation or more. The amounts charged per operation and the total amounts charged are also not particular limited, but may be determined from amount of B contained in the raw material metal silicon, the amount of B in the silicon desired to be reached in the end, the B distribution coefficient, and the later explained B vaporization and dissipation amount. Naturally, it is also possible to use exactly the suitable number of operations to charge the silicon dioxide and the carbonate of an alkali metal etc., then discharge the slag, and again charge silicon dioxide and the carbonate of an alkali metal etc. Sufficient amounts of the silicon dioxide and the carbonate of an alkali metal etc. for the silicon may also be charged by a single operation enabling the concentration of boron in the silicon to fall to a predetermined value, but if possible it is better to perform the series of refining steps of charging the silicon dioxide and the carbonate of an alkali metal etc. and discharging the slag a plurality of times repeatedly. Further, if, in the state with the concentration of boron in the molten silicon being 1 mass ppm or less, new silicon dioxide and carbonate of an alkali metal etc. are charged, the B distribution coefficient can be increased. This is extremely advantageous for B removal.

Next, regarding the B vaporization and dispersal, if desiring to increase the amount of B vaporization and dispersal, it is preferable that part of the top melt surface of the melt as a whole be molten silicon. If charging silicon dioxide and the carbonate of an alkali metal etc. into the molten silicon, these will float up in the molten silicon. The slag formed from the two will also float up in the molten silicon. These agglomerate and float up at the periphery of the crucible or float up forming island shapes when small in amount, but when larger in amount, end up covering the entire melt surface. According to various experiments of the inventors, to increase the amount of B vaporization and dispersal, it is important that the molten silicon be in a visible state on the melt surface. For example, when using crucibles of equivalent diameters and heights, when the amounts charged of the silicon dioxide and carbonate of an alkali metal etc. reach two-tenths of the mass of the molten silicon or so, in general molten silicon appears at part of the surface. From this, for example, when slag refining by a total amount of silicon dioxide and a carbonate of an alkali metal etc. of double the amount of the silicon, rather than charge these at one time into the molten silicon, it is preferable to charge them a little at a time and, when the amount of slag on the silicon becomes two-tenths the silicon, tilt the crucible or perform another operate to discharge the slag on the molten silicon and leave only molten silicon in the crucible, then again charge little amounts of silicon dioxide and the carbonate of an alkali metal etc. at a time. If in this way the amount of silicon dioxide and the carbonate of an alkali metal etc. charged into the silicon is within two-tenths of the silicon, as explained above, the molten silicon will always appear at the melt surface. If performing this operation 10 times, a total amount of silicon dioxide and the carbonate of an alkali metal of double the amount of the silicon will be charged, but molten silicon will always be exposed at part of the melt surface and therefore the amount of B vaporization and dispersal will increase. The reason why the exposure of the molten silicon surface is effective for increasing the amount of B vaporization and dispersal is not known, but the inventors believe as follows: Previously, the inventors guessed alluding to the possibility that the vaporization seed of B was $NaBO_2$, but, for example, considering that the region where this vaporization seed is formed and vaporizes is at the multiphase interfaces between the molten silicon and the silicon dioxide and the carbonate of an alkali metal etc. or the slag produced from the same and the air, this phenomenon can be explained. However, exposure of the molten silicon surface is not essential for vaporization and dispersal of B. In the end, the effect is on the relative increase in the amount of vaporization and dispersal. How much the amount of vaporization and dispersal increases will be explained in the examples.

As the ratio of the silicon dioxide and the carbonate of an alkali metal etc. added, a mole of the silicon element in the silicon dioxide is 0.05 to 20 times the mole of the alkali element in the carbonate of an alkali metal etc. More preferably, it is in a range of 0.2 to 4. In the case of such a ratio of composition, B can be efficiently removed from the molten silicon.

As the form of the silicon dioxide, fine powder of a size of 1 mm or less, granules of a size of several mm or so, larger clumps, or mixtures of the same may be used. However, if too large in size, the reaction will take a long time, so a size of 5 cm or so or less is preferable.

As the carbonate of an alkali metal etc., one or more of lithium carbonate, sodium carbonate, potassium carbonate, lithium hydrogen carbonate, sodium hydrogen carbonate, potassium hydrogen carbonate, or their hydrates may be used. Further, as the form of the carbonate of an alkali metal or hydrate of said carbonate, any of a fine powder, clumps, flakes, or mixtures of the same may be used.

As the atmosphere when working the present invention, an inert atmosphere or the air atmosphere may be used. In the air atmosphere, the molten silicon would seemingly be oxidized, but in fact when working the invention in the air, the amount of silicon oxidized by the air is extremely small.

The pressure of the atmosphere is not particularly limited so the invention may be easily worked at atmospheric pressure.

That is, in working the present invention, a simple atmospheric furnace may be used. The silicon dioxide and the carbonate of an alkali metal etc. may be added to the molten silicon by just charging them into the melt surface, that is, addition can be performed extremely easily. However, the conditions for working the present invention are not limited to atmospheric pressure. The invention may also be worked under reduced pressure or under pressure.

The slag formed by the silicon dioxide and the carbonate of an alkali metal etc. and the molten silicon may be separated using a general method. For example, the crucible may be tilted to discharge the top slag and leave the molten silicon, then the molten silicon may be transferred to a predetermined mold etc. Further, while the apparatus would become complicated, if providing the bottom of the crucible with a open/closeable tap hole, it would be possible to discharge only the molten silicon first while leaving the top slag.

Further, in such a case, the higher the slag in viscosity, the easier it is for just the molten silicon to be discharged. For this purpose, it is also effective to add some third ingredient to the slag. For example, if adding one-tenth or so the total amount of silicon dioxide and carbonate of an alkali metal etc. of $Al_2O_3$, the slag viscosity will become higher and the separability from the silicon will become better. In this case, since $Al_2O_3$ itself has no effect on B removal, it is perfect for this purpose. Other than $Al_2O_3$, an oxide with a high melting point of 1500° C. or so or a compound forming such an oxide may also be used for this purpose. As such an oxide, there are MgO, $ZrO_2$, CaO, etc. However, adding an extra additive would also result in any B contained in the additive being introduced into the crucible, so if possible such a third ingredient is preferably not added. Even if added, it is preferably added in an equal amount or less, by mass, of the total amount of the silicon dioxide and the carbonate of an alkali metal etc., preferably ½ or less.

EXAMPLES

Example 1

15 kg of metal silicon containing 12 mass ppm of B was charged into a 270 mm inside diameter, 250 mm depth carbon crucible, melted in the atmosphere at 1500° C., then charged with 7.5 kg of silica sand ($SiO_2$) containing 1.5 mass ppm of B and 7.5 kg of powder $Na_2CO_3$ containing 0.3 mass ppm of B. With this charged amount, the entire melt surface was covered with slag. After 30 minutes, an 8 mm diameter quartz tube was used to suck up several grams of the molten state silicon and slag for use as a sample for analysis (hereinafter referred to as the "Sample 1"). Next, the crucible was tilted and only the top slag was discharged. Further, again, the molten silicon was charged on top with 7.5 kg of silica sand and 7.5 kg of powder $Na_2CO_3$. After 30 minutes, again an 8 mm diameter quartz tube was used to suck up several grams of the molten state silicon and slag for use as a sample for analysis (hereinafter referred to as the "Sample 2"). Finally, the crucible was tilted and only the top slag was removed, then the silicon was discharged to a separate mold and cooled and solidified.

After the experiment, the sampled silicons and slags were analyzed, whereupon the Sample 1 silicon had a B concentration of 1.7 mass ppm, the slag had a B concentration of 12 mass ppm, the Sample 2 silicon had a B concentration of 0.29 mass ppm, and the slag had a B concentration of 3.2 mass ppm. From this, it was learned that the Sample 1 had a B distribution coefficient of approximately 7.1, while the Sample 2 had a B distribution coefficient of approximately 11. Further, the silicon discharged into the casting mold had a B concentration the same as the B concentration of the Sample 2 silicon.

Further, the total amount of B was found from the silicon and the discharged slag after the end of the experiment, whereupon the initial total amount of B was approximately 80%. It was learned that approximately 20% of the B vaporized.

Comparative Example 1

15 kg of the silica sand and 15 kg of the $Na_2CO_3$ used in Example 1 were melted at 1400° C., then cooled and solidified, whereupon approximately 23.6 kg of a glassy solid was obtained. This was crushed into clumps of several cm size which were then washed with pure water. These were then divided into two amounts of 11.8 kg and used as refining slag.

After this, by a similar procedure as in Example 1, 15 kg of metal silicon containing 12 mass ppm of B was charged into a carbon crucible and melted in the atmosphere at 1500° C., then 11.8 kg of the above refining slag was charged. After 30 minutes, an 8 mm diameter quartz tube was used to suck up several grams of molten state silicon and slag for use as a sample for analysis (hereinafter referred to as the "Sample 3"). Next, the crucible was tilted and only the top slag was discharged. Further, the molten silicon was again charged on top with 11.8 kg of the above refining slag. After 30 minutes, again, an 8 mm diameter quartz tube was used to suck up several grams of molten state silicon and slag for use as a sample for analysis (hereinafter referred to as the "Sample 4"). Finally, the crucible was tilted and only the top slag was removed, then the silicon was discharged to a separate mold and cooled and solidified.

After the experiment, the sampled silicons and slags were analyzed, whereupon the Sample 3 silicon had a B concentration of 4.8 mass ppm, the slag had a B concentration of 10 mass ppm, the Sample 4 silicon had a B concentration of 2.3 mass ppm, and the slag had a B concentration of 4.8 mass ppm. Due to this, it was learned that Sample 3 and Sample 4 had B distribution coefficients of both approximately 2.1. Further, the silicon discharged into the casting mold had a B concentration the same as the B concentration of the Sample 4 silicon.

Further, after the end of the experiment, the total amount of B was found, whereupon it substantially the same as the initial total amount of B. No vaporization of B could be observed.

In this way, with just the difference of the silica sand and the $Na_2CO_3$ being converted to slag in advance, results far inferior to those of Example 1 were obtained.

Comparative Example 2

Except for not charging any silica sand ($SiO_2$) and charging only $Na_2CO_3$ twice, the exact same experiment as in Example 1 was performed.

The initial sampling (Sample 5) of silicon had a B concentration of 6.1 mass ppm, the slag had a B concentration of 13 mass ppm, the second sampling (Sample 6) of silicon had a B concentration of 3.3 mass ppm, and the slag had a B concentration of 7.5 mass ppm. Due to this, it was learned that Sample 5 had a B distribution coefficient of approximately 2.1, and Sample 6 had a B distribution coefficient of approximately 2.3. Further, the silicon discharged into the casting mold had a B concentration the same as the B concentration of the Sample 6 silicon.

Further, the total amount of B was found from the silicon and the discharged slag after the end of the experiment, whereupon the initial total amount of B was approximately 96%. It was learned that approximately 4% of the B vaporized.

In this way, if not adding silica sand and adding only Na$_2$CO$_3$, both the B distribution coefficient and amount of vaporization of B became far inferior to those of Example 1.

Example 2

The silicon of the B concentration of 0.29 mass ppm obtained in Example 1 was further refined. A carbon crucible similar to Example 1 was charged with 10 kg of the silicon obtained in Example 1. This was melted in the atmosphere at 1500° C., then 1 kg of silica sand (SiO$_2$) containing 1.5 mass ppm of B and 1 kg of powder Na$_2$CO$_3$ containing 0.3 mass ppm of B were charged. With the first amounts charged, half or so of the surface of the melt was covered with molten silicon. After 30 minutes, the crucible was tilted and only the top slag was discharged. The above silica sand was charged in an amount of 1 kg and the Na$_2$CO$_3$ in 1 kg. After 30 minutes, the crucible was tilted to discharge only the top slag. This operation was performed at total of three times. Finally, the silicon was discharged to a separate mold and cooled and solidified.

After the experiment, the final silicon was analyzed, whereupon the B concentration was 0.06 mass ppm, and the corresponding slag had a B concentration of 0.71 mass ppm. Due to this, it was learned that the B distribution coefficient was approximately 12.

Further, the total amount of B was found from the silicon and the discharged slag after the end of the experiment, whereupon the initial total amount of B was approximately 35%. It was learned that approximately 65% of the B vaporized.

Example 3

Except for charging 8.8 kg of a monohydrate of powder Na$_2$CO$_3$ containing 0.5 mass ppm of B instead of Na$_2$CO$_3$, the exact same experiment as in Example 1 was performed.

The initial sampling (Sample 7) of silicon had a B concentration of 1.6 mass ppm, the slag had a B concentration of 13 mass ppm, the second sampling (Sample 8) of silicon had a B concentration of 0.28 mass ppm, and the slag had a B concentration of 3.4 mass ppm. Due to this, it was learned that Sample 7 had a B distribution coefficient of approximately 8.1, while Sample 8 had a B distribution coefficient of approximately 12. Further, the silicon discharged into the casting mold had a B concentration the same as the B concentration of the Sample 8 silicon.

Further, the total amount of B was found from the silicon and the discharged slag after the end of the experiment, whereupon the initial total amount of B was approximately 80%. It was learned that approximately 20% of the B vaporized.

Example 4

Except for charging 9.8 kg of powder K$_2$CO$_3$ containing 0.6 mass ppm of B instead of Na$_2$CO$_3$, the exact same experiment as in Example 1 was performed.

The initial sampling (Sample 9) of silicon had a B concentration of 2.0 mass ppm, the slag had a B concentration of 10 mass ppm, the second sampling (Sample 10) of silicon had a B concentration of 0.29 mass ppm, and the slag had a B concentration of 2.8 mass ppm. Due to this, it was learned that Sample 9 had a B distribution coefficient of 5.0, while Sample 10 had a B distribution coefficient of approximately 9.7. Further, the silicon discharged into the casting mold had a B concentration the same as the B concentration of the Sample 10 silicon.

Further, the total amount of B was found from the silicon and the discharged slag after the end of the experiment, whereupon the initial total amount of B was approximately 80%. It was learned that approximately 20% of the B vaporized.

Example 5

Except for changing the first amounts charged to 9.0 kg of silica sand (SiO$_2$) and 6.0 kg of powder Na$_2$CO$_3$, the exact same experiment as in Example 1 was performed.

The initial sampling (Sample 11) of silicon had a B concentration of 1.9 mass ppm, the slag had a B concentration of 12 mass ppm, the second sampling (Sample 12) of silicon had a B concentration of 0.29 mass ppm, and the slag had a B concentration of 3.2 mass ppm. Due to this, it was learned that Sample 11 had a B distribution coefficient of 6.3, while Sample 12 had a B distribution coefficient of approximately 11. Further, the silicon discharged into the casting mold had a B concentration the same as the B concentration of the Sample 12 silicon.

Further, the total amount of B was found from the silicon and the discharged slag after the end of the experiment, whereupon the initial total amount of B was approximately 85%. It was learned that approximately 15% of the B vaporized.

INDUSTRIAL APPLICABILITY

By using the present method and the one-directional solidification method or vacuum melting method, it is possible to refine metal silicon into high purity silicon able to be used for solar batteries extremely inexpensively. Further, the obtained high purity silicon is not limited to silicon raw materials for solar batteries and may also be utilized for various types of industries requiring high purity silicon.

The invention claimed is:

1. A method for removing boron from silicon, comprising heating metal silicon containing boron as an impurity to a temperature ranging from the melting point of silicon to 2200° C. to place it in a molten state, then adding a solid comprising silicon dioxide and a solid comprising one or both of a carbonate of an alkali metal or a hydrate of a carbonate of an alkali metal into said molten silicon so as to form a slag containing boron on said molten silicon and remove the boron from the silicon, wherein any solid added to the molten silicon is not a solid that generates a chloride containing gas when added to molten silicon.

2. The method for removing boron from silicon as set forth in claim 1, wherein the formed slag is discharged.

3. The method for removing boron from silicon as set forth in claim 2, wherein the interval from adding the solid consisting essentially of silicon dioxide and the solid consisting essentially of one or both of a carbonate of an alkali metal or a hydrate of a carbonate of an alkali metal to then discharging the formed slag is 5 minutes or more.

4. The method for removing boron from silicon as set forth in claim 1, wherein the solid consisting essentially of silicon dioxide and the solid consisting essentially of one or both of a carbonate of an alkali metal or a hydrate of a carbonate of an alkali metal are added simultaneously.

5. The method for removing boron from silicon as set forth in claim 1, wherein the solid consisting essentially of silicon dioxide and the solid consisting essentially of one or both of a carbonate of an alkali metal or a hydrate of a carbonate of an alkali metal are added separately.

6. The method for removing boron from silicon as set forth in claim 5, wherein the interval of said addition is within 30 minutes.

7. The method for removing boron from silicon as set forth in claim 1, wherein the addition of the solid consisting essentially of silicon dioxide and the solid consisting essentially of one or both of a carbonate of an alkali metal or a hydrate of a carbonate of an alkali metal is divided into two or more operations.

8. The method for removing boron from silicon as set forth in claim 7, wherein the already formed slag is discharged, and then the solid consisting essentially of silicon dioxide and the solid consisting essentially of one or both of a carbonate of an alkali metal or a hydrate of a carbonate of an alkali metal are newly added.

9. The method for removing boron from silicon as set forth in claim 8, wherein the interval from when adding the solid consisting essentially of silicon dioxide and the solid consisting essentially of one or both of a carbonate of an alkali metal or a hydrate of a carbonate of an alkali metal to molten silicon to then discharging the formed slag is 5 minutes or more.

10. The method for removing boron from silicon as set forth in claim 8, the process of adding the solid consisting essentially of silicon dioxide and the solid consisting essentially of one or both of a carbonate of an alkali metal or a hydrate of a carbonate of an alkali metal to form slag is performed, and then the slag is discharged a plurality of times.

11. The method for removing boron from silicon as set forth in claim 10, wherein while performing the processing of adding the solid consisting essentially of silicon dioxide and the solid consisting essentially of one or both of a carbonate of an alkali metal or a hydrate of a carbonate of an alkali metal to form slag, then discharging the slag a plurality of times, the concentration of boron in the molten silicon becomes 1 mass ppm or less.

12. The method for removing boron from silicon as set forth in claim 1, wherein the solid consisting essentially of silicon dioxide and the solid consisting essentially of one or both of a carbonate of an alkali metal or a hydrate of a carbonate of an alkali metal are added in amounts whereby the formed slag does not completely cover the surface of the molten silicon.

13. The method for removing boron from silicon as set forth in claim 1, wherein a mole of silicon in the silicon dioxide added is 0.05 to 20 times the mole of the alkali element in one or both of the carbonate of an alkali metal and the hydrate of a carbonate of an alkali metal.

14. The method for removing boron from silicon as set forth in claim 1, wherein the alkali element of one or both of the carbonate of an alkali metal and the hydrate of a carbonate of an alkali metal is one or more of lithium, sodium, and potassium.

15. The method for removing boron from silicon as set forth in claim 14, wherein one or both of the carbonate of an alkali metal and the hydrate of a carbonate of an alkali metal is one or more of lithium carbonate, sodium carbonate, potassium carbonate, lithium bicarbonate, sodium bicarbonate, potassium bicarbonate, or their hydrates.

* * * * *